United States Patent
Takahashi et al.

(10) Patent No.: US 9,350,542 B2
(45) Date of Patent: May 24, 2016

(54) QUANTUM KEY DISTRIBUTION DEVICE, QUANTUM KEY DISTRIBUTION SYSTEM, AND QUANTUM KEY DISTRIBUTION METHOD

(71) Applicant: Kabushiki Kaisha Toshiba, Minato-ku (JP)

(72) Inventors: Ririka Takahashi, Setagaya (JP); Yoshimichi Tanizawa, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/605,331

(22) Filed: Jan. 26, 2015

(65) Prior Publication Data

US 2015/0215122 A1    Jul. 30, 2015

(30) Foreign Application Priority Data

Jan. 30, 2014 (JP) ................... 2014-015771

(51) Int. Cl.
 *H04L 9/08* (2006.01)

(52) U.S. Cl.
 CPC ............ *H04L 9/0855* (2013.01); *H04L 9/0883* (2013.01)

(58) Field of Classification Search
 CPC combination set(s) only.
 See application file for complete search history.

(56) References Cited

U.S. PATENT DOCUMENTS

| 2007/0076871 A1* | 4/2007 | Renes | H04L 9/0858 380/201 |
| 2013/0083926 A1* | 4/2013 | Hughes | H04L 9/0836 380/278 |
| 2013/0101121 A1* | 4/2013 | Nordholt | H04L 9/0852 380/279 |
| 2013/0251145 A1* | 9/2013 | Lowans | H04L 9/0838 380/44 |
| 2013/0315395 A1* | 11/2013 | Jacobs | H04L 9/0852 380/278 |
| 2014/0372812 A1* | 12/2014 | Lutkenhaus | H04L 9/0855 714/57 |
| 2015/0222619 A1* | 8/2015 | Hughes | H04L 63/08 713/168 |

OTHER PUBLICATIONS

Iris Choi et al., "Quantum Key Distribution on a 10Gb/s WDM-PON", Optics Express, vol. 18, No. 9, Apr. 2010, 13 pages.
Bernd Fröhlich et al., "A Quantum Access Network", Nature, vol. 501, Sep. 5, 2013, 5 pages.

* cited by examiner

*Primary Examiner* — Beemnet Dada
(74) *Attorney, Agent, or Firm* — Oblon, McClelland, Maier & Neustadt, L.L.P

(57) ABSTRACT

According to an embodiment, a quantum key distribution (QKD) device includes a sharing unit, a correcting unit, a deciding unit, a calculator, and a privacy amplifier. The sharing unit is configured to generate a shared bit string through quantum key distribution with each other QKD device connected via quantum communication channels. The correcting unit is configured to generate a corrected bit string through an error correction process on the shared bit string. The deciding unit is configured to calculate an error rate in the corresponding quantum communication channel with respect to each other QKD device, and decide on a combined error rate from error rates calculated. The calculator is configured to calculate, based on the combined error rate, a length of an encryption key to be shared. The privacy amplifier is configured to generate the encryption key having the calculated length of the encryption key from the corrected bit string.

8 Claims, 11 Drawing Sheets

US 9,350,542 B2

QUANTUM KEY DISTRIBUTION DEVICE, QUANTUM KEY DISTRIBUTION SYSTEM, AND QUANTUM KEY DISTRIBUTION METHOD

CROSS-REFERENCE TO RELATED APPLICATION

This application is based upon and claims the benefit of priority from Japanese Patent Application No. 2014-015771, filed on Jan. 30, 2014; the entire contents of which are incorporated herein by reference.

FIELD

Embodiments described herein relate generally to a quantum key distribution device, a quantum key distribution system, and a quantum key distribution method.

BACKGROUND

A quantum key distribution system is configured with a transmitter, a receiver, and an optical fiber that connects the transmitter and the receiver. The transmitter transmits photons to the receiver via the optical fiber (a quantum communication channel). After that, the transmitter and the receiver exchange control data with each other, and share encryption keys. This technology is implemented using the technology generally referred to as quantum key distribution (QKD).

In quantum key distribution, the behavior of the photons follows the uncertainty principle, which is the fundamental principle of quantum mechanics that tapping leads to changes in the state. Because of such a property, when photons transmitted by a transmitter are tapped by an eavesdropper in a quantum communication channel, the state of the photons undergoes a change and the receiver that receives the photons becomes able to get to know that the photons have been tapped by an eavesdropper.

In the conventional quantum key distribution system, sharing of encryption keys among nodes is assumed to be on one-to-one basis. Thus, sharing of encryption keys is performed in pairs of a transmitter that sends photons and a receiver that receives photons. However, in recent years, it has become possible to share, on a one-to-many basis, encryption keys among nodes that are connected via an optical device. In that regard, attention is being given to a quantum access network (QAN) in which a single receiver can share encryption keys with a number of transmitters.

In order to generate an encryption key that is to be shared using quantum key distribution, a key distillation process is performed while the transmitter and the receiver communicate to each other. The key distillation process includes a shifting process for sharing a bit string, which serves as the basis for the encryption key, between the transmitter and the receiver; an error correction process for correcting errors in the shared bit string; and a key compression process (a privacy amplification (PA) process) for removing the information that has leaked to an eavesdropper during the shifting process and the error correction process.

In a one-to-many type of quantum key distribution system including a quantum access network, the key distillation process performed for the purpose of sharing encryption keys between transmitters and receivers is performed in each node (each transmitter and each receiver). In that case, the "many" nodes of the one-to-many communication perform the key distillation process only for themselves, while the "one" node connected to the "many" nodes needs to perform the key distillation process for a plurality of nodes. Consequently, the single node (a transmitter or a receiver) that is connected to a plurality of nodes (receivers or transmitters) needs to perform many processes. Hence, as compared to the plurality of nodes, there occurs a bias in the processing load of the single node.

DETAILED DESCRIPTION

Figure 1:
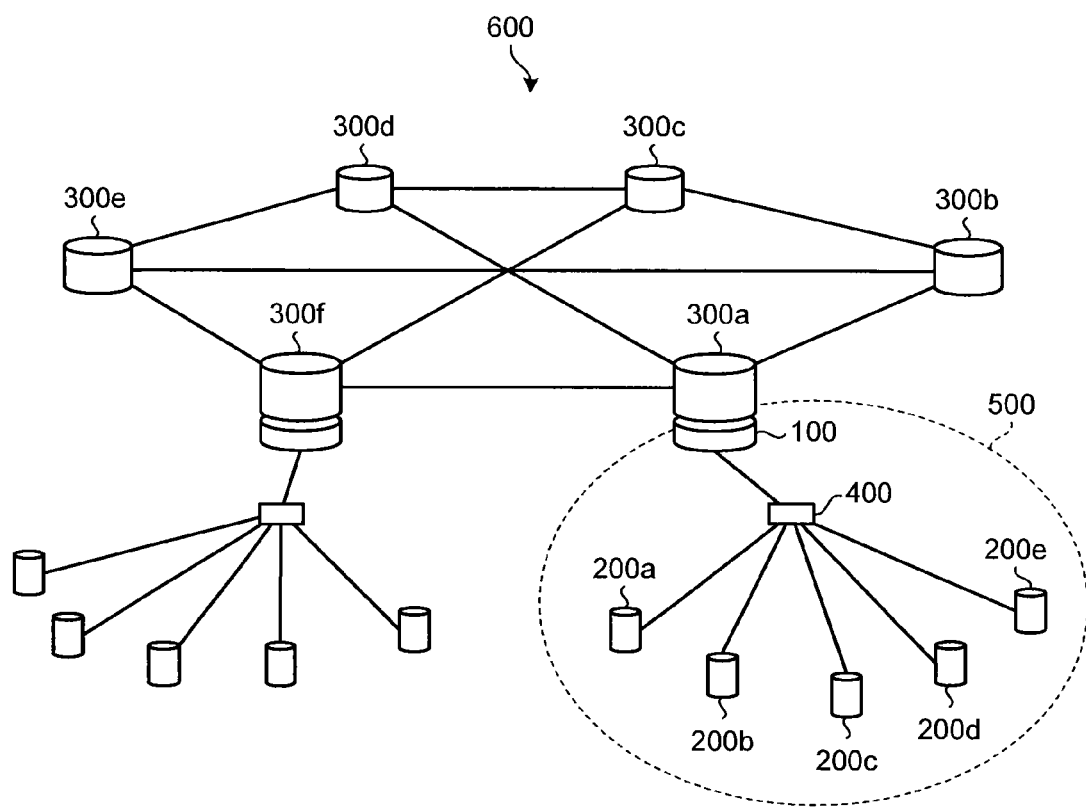
FIG. 1 is a diagram illustrating an overall configuration of a quantum key distribution network.

According to an embodiment, a quantum key distribution device includes a quantum key sharing unit, a correcting unit, a deciding unit, a calculator, and a privacy amplifier. The quantum key sharing unit is configured to generate a shared bit string by performing quantum key distribution with each of a plurality of other quantum key distribution devices connected via quantum communication channels. The correcting unit is configured to generate a corrected bit string by performing an error correction process to correct an error present in the shared bit string. The deciding unit is configured to calculate an error rate in the corresponding quantum communication channel with respect to each of the other quantum key distribution devices, and decide on a combined error rate from a plurality of error rates calculated. The calculator is configured to calculate, based on the combined error rate, a length of an encryption key to be shared. The privacy amplifier is configured to generate the encryption key to be shared with the corresponding other quantum key distribution device from the corrected bit string, by performing a key compression process such that the encryption key has the calculated length of the encryption key.

Exemplary embodiments of a quantum key distribution device, a quantum key distribution system, and a quantum key distribution method according to the invention are described below in detail with reference to the accompanying drawings. In the accompanying drawings, the same constituent elements are referred to by the same reference numerals. However, the drawings are only schematic in nature, and there may be times when the relationship between the thickness and the flat dimension as well as the ratio of the thickness in each layer is different than the reality. Hence, the specific thickness and dimensions should be determined by taking into account the explanation given below.

First Embodiment

Figure 2:
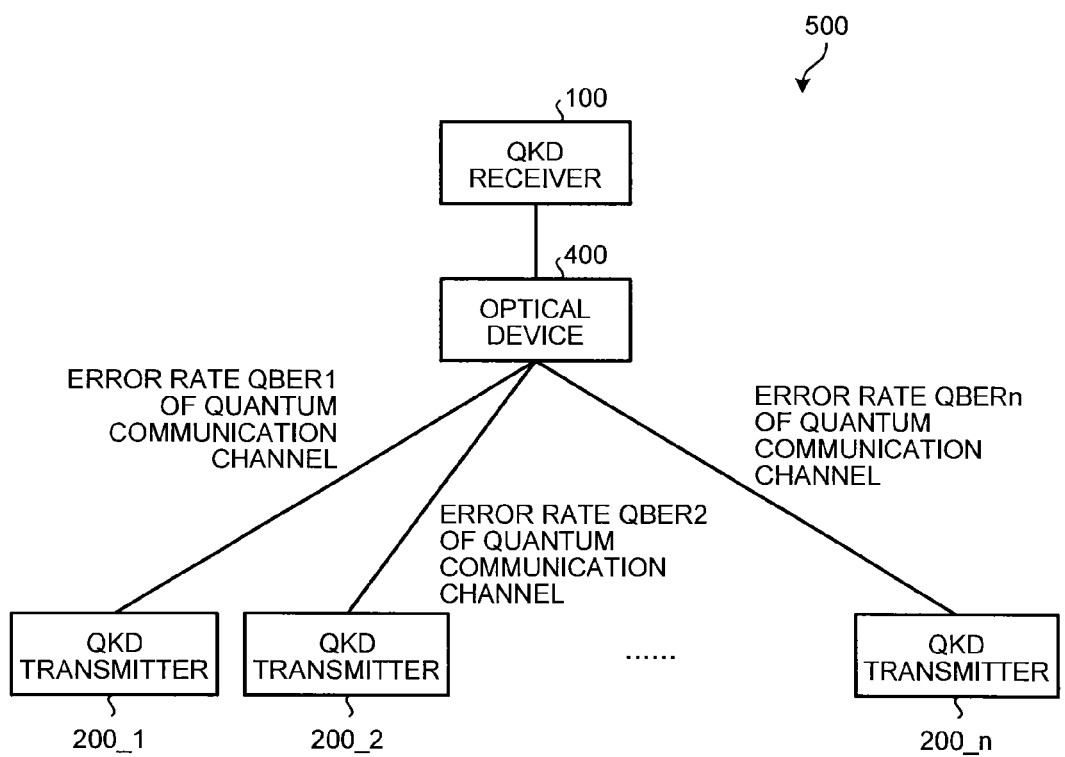
FIG. 2 is a diagram illustrating a configuration of a quantum access network according to a first embodiment.

FIG. 1 is a diagram illustrating an overall configuration of a quantum key distribution network. FIG. 2 is a diagram illustrating a configuration of a quantum access network according to a first embodiment. Explained below with reference to FIG. 1 is a configuration of a quantum key distribution network 600 and a quantum access network 500.

As illustrated in FIG. 1, the quantum key distribution network 600 is a network in which QKD devices 300a to 300f are connected (linked) to each other on a one-to-one basis via quantum communication channels. In the one-to-one links of the QKD devices illustrated in FIG. 1, identical encryption keys are generated and shared using quantum key distribution.

Of the QKD devices 300a to 300f, the QKD device 300a is connected to a plurality of QKD transmitters 200a to 200e by quantum communication channels via an optical device 400. In this case, the QKD device 300a functions as a QKD receiver 100. Moreover, a network including the QKD receiver 100, the optical device 400, and the QKD transmitters 200a to 200e represents the quantum access network 500.

In FIG. 2 is illustrated a detailed configuration of the quantum access network 500. In FIG. 2, a one-to-many type of quantum access network is illustrated in a generalized manner. Thus, a state is illustrated in which n number of QKD transmitters 200_1 to 200_n are connected to the QKD receiver 100 via the optical device 400. The QKD receiver 100 is connected to the optical device 400 by an optical fiber cable serving as a quantum communication channel. Similarly, each of the QKD transmitters 200_1 to 200_n is also connected to the optical device 400 by an optical fiber cable serving as a quantum communication channel.

With reference to FIG. 2, a QBER (where QBER stands for Quantum Bit Error Rate) represents the percentage of error bits that, when an error correcting unit (described later) performs error correction with respect to a shared bit string that is shared between a QKD transmitter and a QKD receiver and generates a corrected bit string, are calculated during the error correction from the number of corrected errors in the shared bits between the QKD transmitter and the QKD receiver. Herein, the QBER represents a value that is calculated independently for each quantum communication channel. In the link between the QKD receiver 100 and the QKD transmitter 200_1, a QBER1 is calculated. Similarly, in the link between the QKD receiver 100 and the QKD transmitter 2002_2, a QBER2 is calculated. Moreover, in the link between the QKD receiver 100 and the QKD transmitter 200_n, a QBERn is calculated. Meanwhile, herein, although the QBER is treated as the error rate, that is not the only possible case. Alternatively, the error rate may be calculated according to any other method.

Figure 3:
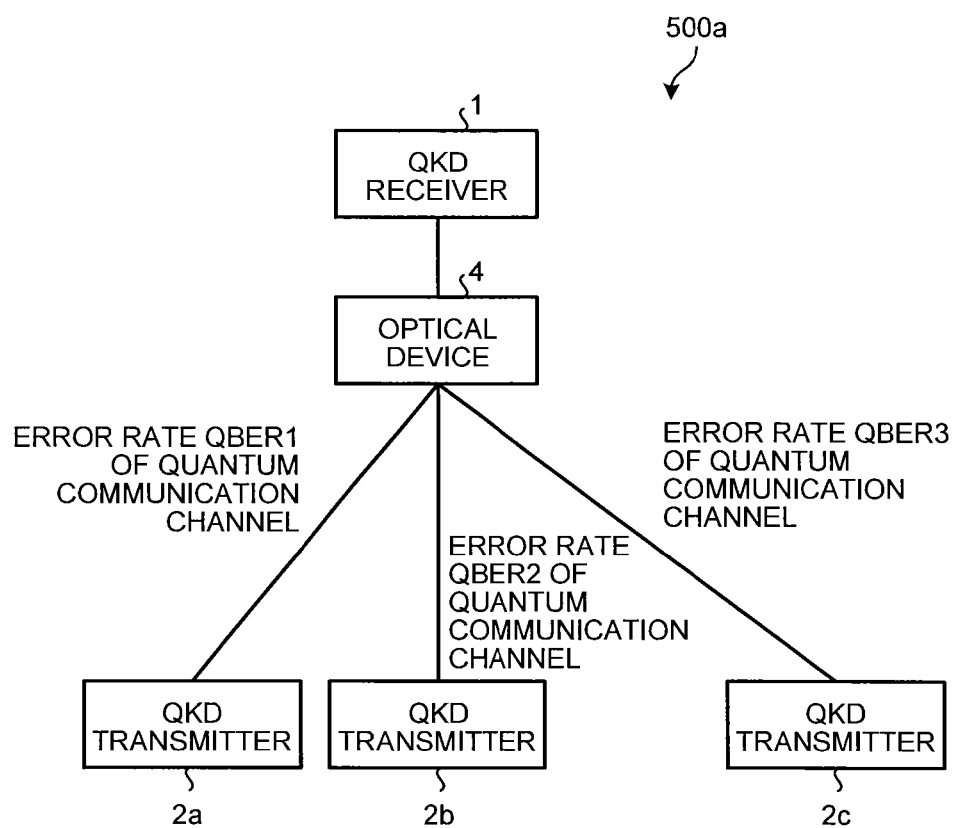
FIG. 3 is a diagram illustrating a specific example of the configuration of the quantum access network according to the first embodiment.

FIG. 3 is a diagram illustrating a specific example of the configuration of the quantum access network according to the first embodiment. With reference to FIG. 3, the explanation is given about a configuration of the quantum access network in which three QKD transmitters are connected to a single QKD receiver. Thus, in the first embodiment, a quantum access network is explained as an example of the quantum key distribution system.

As illustrated in FIG. 3, a quantum access network 500a includes a QKD receiver 1, QKD transmitters 2a to 2c, and an optical device 4. The QKD receiver 1 is connected to the optical device 4 by an optical fiber cable serving as a quantum communication channel. Similarly, each of the QKD transmitters 2a to 2c is also connected to the optical device 4 by an optical fiber cable serving as a quantum communication channel. In the following explanation, in the case of referring to the QKD transmitters 2a to 2c without distinguishing therebetween or in the case of collectively referring to the QKD transmitters 2a to 2c, they are simply referred to as a "QKD transmitter 2".

Herein, for example, each of the QKD transmitters 2a to 2c sends, to the QKD receiver 1 via the optical device 4, a bit string (hereinafter, referred to as a "photon bit string") that is made of single photons which are generated using random numbers and which serve as the basis for generating encryption keys. Moreover, each of the QKD transmitters 2a to 2c performs a shifting process, an error correction process, and a privacy amplification (PA) process (i.e., a key compression process) with respect to the photon bit string that is sent; and generates an encryption key.

Thus, the QKD receiver 1 receives, from each of the QKD transmitters 2a to 2c via the optical device 4, the photon bit string made of single photons that serve as the basis for generating encryption keys. Then, the QKD receiver 1 performs a shifting process, an error correction process, and a PA process with respect to each photon bit string that is received, and generates encryption keys that are identical to the encryption keys generated by the QKD transmitters 2a to 2c, respectively. That is, the QKD receiver 1 and each of the QKD transmitters 2a to 2c generate and share identical encryption keys. More specifically, the QKD receiver 1 holds three different encryption keys; the QKD transmitter 2a holds a first kind of encryption key; the QKD transmitter 2b holds a second kind of encryption key; and the QKD transmitter 2c holds a third kind of encryption key.

Meanwhile, although not illustrated in FIG. 3, aside from the quantum communication channels in the form of the optical fiber cables, the QKD receiver 1 and each of the QKD transmitters 2a to 2c are connected to each other by communication cables (classical communication channels) that are used in communicating regular digital data of 0s and 1s. A classical communication channel need not be a wired communication channel, and can be a wireless communication channel.

In the quantum access network 500a including the QKD receiver 1 and the QKD transmitter 2, in case the single photons transmitted by the QKD transmitter 2 are tapped by an eavesdropper from the optical fiber cable functioning as the quantum communication channel, the photons undergo physical changes thereby enabling the QKD receiver 1 that has received the photons to know that the photons have been tapped by an eavesdropper. Meanwhile, regarding an encryption key generation process performed by the QKD receiver 1 and the QKD transmitter 2, the detailed explanation is given later. Moreover, in order to collectively refer to the QKD receiver 1 and the QKD transmitter 2, the term "QKD device" is used.

Figure 4:
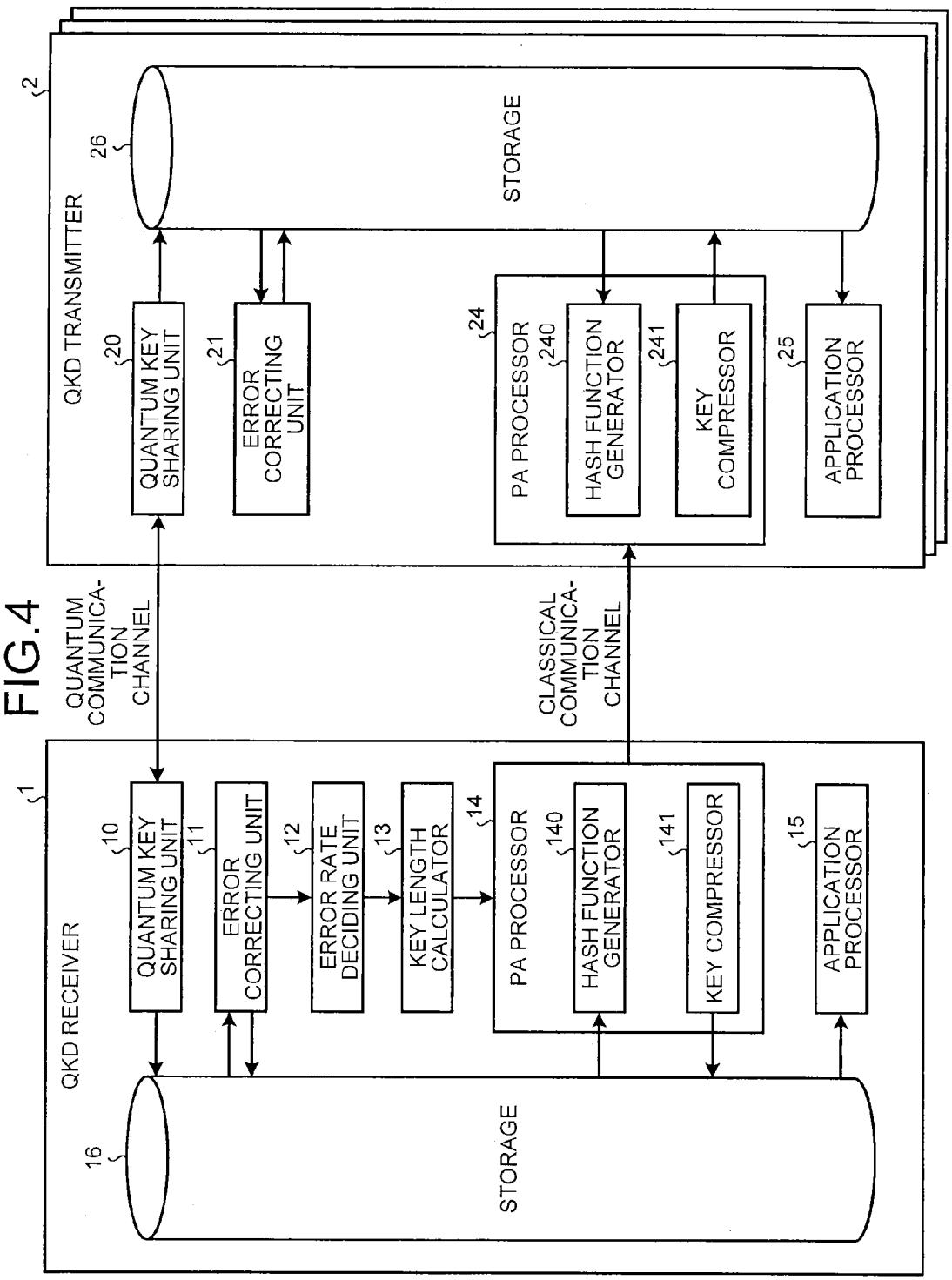
FIG. 4 is a diagram illustrating a block configuration of a QKD receiver and a QKD transmitter.

FIG. 4 is a diagram illustrating a block configuration of a QKD receiver and a QKD transmitter. Thus, the explanation of a functional block configuration of the QKD receiver 1 and the QKD transmitter 2 is given with reference to FIG. 4.

As illustrated in FIG. 4, the QKD receiver 1 (a quantum key distribution device) includes a quantum key sharing unit 10, an error correcting unit 11 (a correcting unit), an error rate deciding unit 12 (a deciding unit), a key length calculator 13 (a calculator), a PA processor 14 (a privacy amplifier), an application processor 15, and a storage 16.

The quantum key sharing unit 10 receives a photon bit string from the QKD transmitter 2 via the quantum communication channel, and reads the photon bit string by using base information generated in a random manner. Then, the quantum key sharing unit 10 receives the base information that is generated in a random manner by the QKD transmitter 2 (by a quantum key sharing unit 20 (described later)) for the purpose of sending photon bit strings. Subsequently, the quantum key sharing unit 10 compares the base information generated by itself with the base information received from the quantum key sharing unit 20; extracts the bits corresponding to the matching portion in the base information from the photon bit string; treats the extracted bits as a shared bit string; and stores the shared bit string in the storage 16. The length of the shared bit string is determined based on the base information generated in a random manner by the quantum key sharing units 10 and 20. Hence, statistically, the length of the shared bit string is substantially half of the photon bit string. Herein, in order to simplify the subsequent processes, the quantum key sharing unit 10 sets the same length of the shared bit string corresponding to each QKD transmitter 2.

The error correcting unit 11 reads a shared bit string from the storage 16; exchanges control data with an error correcting unit 21 (described later); corrects the bit errors in the shared bit string; and generates a corrected bit string. Then, the error correcting unit 11 stores the corrected bit string in the storage 16. Herein, the corrected bit string generated by the error correcting unit 11 matches with a corrected bit string that is generated by the error correcting unit 21 of the QKD transmitter 2 (described later) by performing correction (an error correction process) with respect to the shared bit string. Moreover, since the corrected bit string is generated by correcting the bit errors in the shared bit string, the length of the shared bit string is identical to the length of the corrected bit string.

From the number of errors corrected during the error correction process performed to generate a corrected bit string, the error rate deciding unit 12 calculates the QBER. Since the QKD receiver 1 has the QKD transmitters 2a to 2c connected thereto, the error rate deciding unit 12 calculates the QBER1 to QBER3 corresponding to the QKD transmitters 2a to 2c, respectively. Then, from among the QBER1 to QBER3, the error rate deciding unit 12 decides on the maximum value as a combined error rate (hereinafter, referred to as a "QBERmax").

The reason for setting the maximum value of the QBER1 to QBER3 as the QBERmax is to ensure security of cryptographic communication using encryption keys. It is known that, greater the QBER, greater is the amount of information leaked to an eavesdropper; and, smaller the QBER, smaller is the amount of information leaked to an eavesdropper. In the first embodiment, as described later, the key length calculator 13 calculates a length s of encryption keys based on the QBERmax that is common to all QKD transmitters. Hence, for example, if the minimum value from among the error rates is treated as the combined error rate, then there are times when the amount of information leaked to an eavesdropper is estimated to be small in volume and the information that is actually leaked to an eavesdropper cannot be completely removed. For that reason, in order that the error rate is estimated to be high, the maximum value from among the QBER1 to QBER3 is set to be the combined error rate. As a result, the amount of information leaked to an eavesdropper is completely removed thereby ensuring that the security is not compromised.

According to the QBERmax decided by the error rate deciding unit 12, the key length calculator 13 calculates the length s of encryption keys to be eventually generated. Herein, the length s of encryption keys is same in each link between the QKD receiver 1 and the QKD transmitter 2 (the QKD transmitters 2a to 2c).

The PA processor 14 includes a hash function generator 140 (a function generator) and a key compressor 141 (a compressor). The PA processor 14 performs a key compression process (a privacy amplification process, a PA process) with respect to the corrected bit string with the aim of removing the amount of information that has possibly been tapped by an eavesdropper during the operations of the quantum key sharing unit 10 and the error correcting unit 11.

In order to generate a hash function required during the key compression process (described later), the hash function generator 140 generates a random number r for the purpose of generating a hash function having the size corresponding to the length s of encryption keys. Then, the PA processor 14 sends the information on the length s of encryption keys and the random number r to each QKD transmitter 2 (a PA processor 24) via the classical communication channel. The hash function generator 140 reads the corrected bit string from the storage 16 and generates a hash function from the length of the corrected bit length, the random number r, and the length s of encryption keys. The key compressor 141 performs the key compression process in which the hash function is multiplied to the corrected bit string; generates an encryption key (a key bit string) having the length s; and stores the encryption key in the storage 16.

The application processor 15 reads the encryption key from the storage 16 as may be necessary, and provides the encryption key to an external application for the purpose of performing cryptographic communication.

Meanwhile, the quantum key sharing unit 10, the error correcting unit 11, the error rate deciding unit 12, the key length calculator 13, the PA processor 14, and the application processor 15 can be implemented either using computer programs that are executed in a central processing unit (CPU) 80 (described later) or using hardware circuitry. Moreover, although it is assumed that the quantum key sharing unit 10 and the error correcting unit 11 store the shared bit string and the corrected bit string, respectively, in the storage 16; it is not always necessary to store the bit strings.

As illustrated in FIG. 4, the QKD transmitter 2 (another quantum key distribution device) includes the quantum key sharing unit 20, the error correcting unit 21, the PA processor 24, an application processor 25, and a storage 26.

The quantum key sharing unit 20 sends, to the QKD receiver 1 via the quantum communication channel, a photon bit string that is made of single photons having a state based on base information generated in a random manner. Then, the quantum key sharing unit 20 compares the base information generated by itself with the base information received from the quantum key sharing unit 10; extracts the bits corresponding to the matching portion in the base information from the photon bit string; treats the extracted bits as a shared bit string; and stores the shared bit string in the storage 26. The length of the shared bit string is determined based on the number or matches for the base information generated in a random manner by the quantum key sharing units 10 and 20. Hence, statistically, the length of the shared bit string is substantially half of the photon bit string. Herein, in order to simplify the subsequent processes, the quantum key sharing unit 20 sets the length of the shared bit string to be same as the length of the shared bit string in the quantum key sharing unit 10. As a result, the length of the shared bit string in the quantum key sharing unit 20 is identical to the length of the shared bit string in other QKD transmitters 2.

The error correcting unit 21 reads the shared bit string from the storage 26; exchanges control data with the error correcting unit 11; corrects the bit errors in the shared bit string; and generates a corrected bit string. Then, the error correcting unit 21 stores the corrected bit string in the storage 26. Herein, the corrected bit string generated by the error correcting unit 21 matches with the corrected bit string that is generated by the error correcting unit 11 of the QKD receiver 1 by performing correction (an error correction process) with respect to the shared bit string. Moreover, since the corrected bit string is generated by correcting the bit errors in the shared bit string, the length of the shared bit string is identical to the length of the corrected bit string.

The PA processor 24 includes a hash function generator 240 and a key compressor 241. The PA processor 24 performs a key compression process (a privacy amplification process, a PA process) with respect to the corrected bit string with the aim of removing the amount of information that is likely to have been tapped by an eavesdropper during the operations of the quantum key sharing unit 20 and the error correcting unit 21.

The PA processor 24 receives information on the length s of encryption keys and the random number r from the PA processor 14 via the classical communication channel. The hash function generator 240 reads the corrected bit string from the storage 26; and generates a hash function from the length of the corrected bit string, the random number r, and the length s of encryption keys. The key compressor 241 performs a key compression process in which the hash function is multiplied to the corrected bit string; generates an encryption key (a key bit string) having the length s; and stores the encryption key in the storage 26. The application processor 25 reads the encryption key from the storage 26 as may be necessary, and provides the encryption key to an external application for the purpose of performing cryptographic communication.

Meanwhile, the quantum key sharing unit 20, the error correcting unit 21, the PA processor 24, and the application processor 25 can be implemented either using computer programs that are executed in the CPU 80 (described later) or using hardware circuitry. Moreover, although it is assumed that the quantum key sharing unit 20 and the error correcting unit 21 store the shared bit string and the corrected bit string, respectively, in the storage 26; it is not always necessary to store the bit strings.

Figure 5:
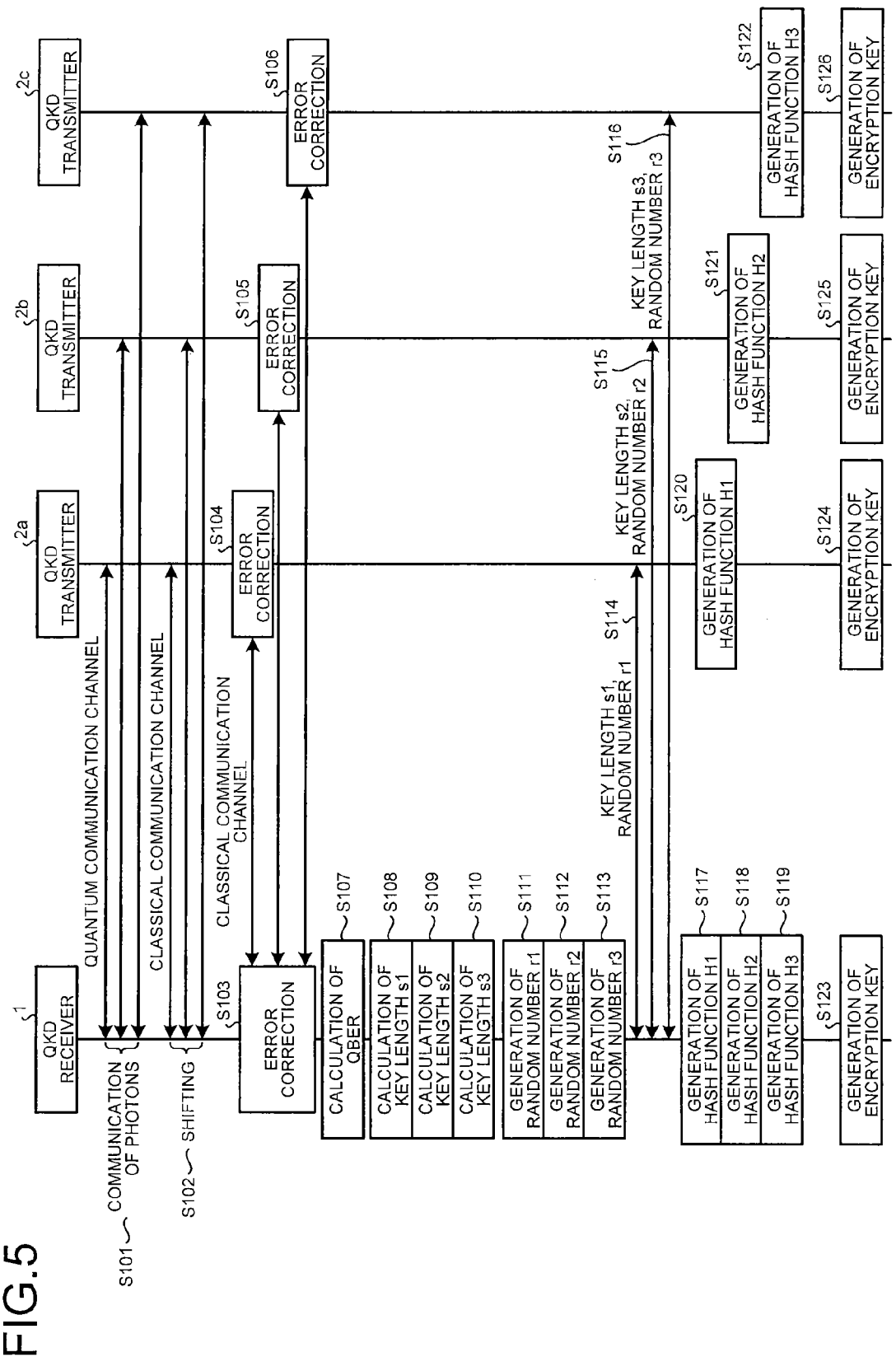
FIG. 5 is a sequence diagram illustrating the operations performed by a conventional QKD device in a quantum access network.
Figure 6:
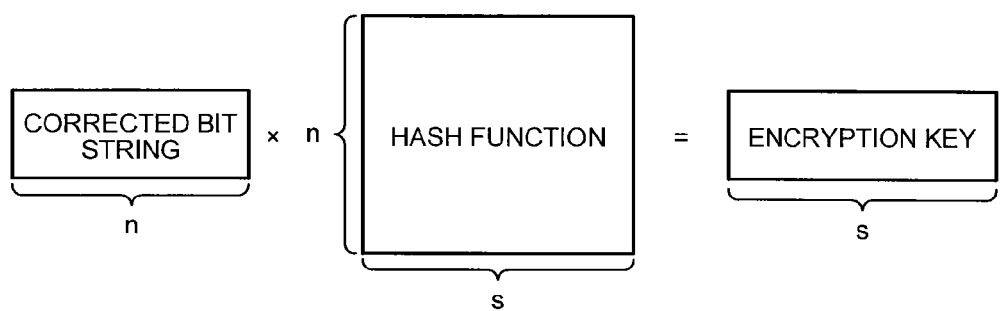
FIG. 6 is a diagram for explaining a key compression process.

FIG. 5 is a sequence diagram illustrating the operations performed by a conventional QKD receiver and a conventional QKD transmitter in a quantum access network. FIG. 6 is a diagram for explaining the key compression process. Thus, explained below with reference to FIGS. 5 and 6 are conventional operations performed by the QKD receiver 1 and the QKD transmitters 2 (the QKD transmitters 2a to 2c) for generating encryption keys.

Step S101

For example, the quantum key sharing unit 20 sends, to the quantum key sharing unit 10 of the QKD receiver 1 via the quantum communication channel, a photon bit string that is made of single photons having a state based on base information generated in a random manner as against a bit string generated using random numbers. Thus, the quantum key sharing unit 10 receives the photon bit string from the quantum key sharing unit 20 via the quantum communication channel, and reads the photon bit string by using the base information generated in a random manner.

Step S102

The quantum key sharing unit 20 receives the base information generated by the quantum key sharing unit 10 in a random manner for the purpose of reading the received photon bit string. Similarly, the quantum key sharing unit 10 receives the base information generated in a random manner by the quantum key sharing unit 20 for the purpose of sending a photon bit string.

Subsequently, the quantum key sharing unit 20 compares the base information generated by itself with the base information received from the quantum key sharing unit 10; performs a shifting process in which the bits corresponding to the matching portion are extracted from the photon bit strings and treated as a shared bit string; and stores the shared bit string in the storage 26. Then, the quantum key sharing unit 20 sends the shared bit string to the error correcting unit 21.

Similarly, the quantum key sharing unit 10 compares the base information generated by itself with the base information received from the quantum key sharing unit 20; performs a shifting process in which the bits corresponding to the matching portion are extracted from the photon bit strings and treated as a shared bit string; and stores the shared bit string in the storage 16. Then, the quantum key sharing unit 10 sends the shared bit string to the error correcting unit 11. In this case, the quantum key sharing unit 10 generates three shared bit strings corresponding to the three QKD transmitters 2.

Step S103

The error correcting unit 11 performs an error correction process in which the shared bit string is read from the storage 16; control data is exchanged with the error correcting unit 21 via the classical communication channel; the bit errors in the shared bit string are corrected; and a corrected bit string is generated. Then, the error correcting unit 11 stores the corrected bit string in the storage 16. In this case, the error correcting unit 11 generates three corrected error strings corresponding to the three QKD transmitters 2.

Step S104

The error correcting unit 21 of the QKD transmitter 2a performs an error correction process in which the shared bit string is read from the corresponding storage 26; control data is exchanged with the error correcting unit 11 via the classical communication channel; the bit errors in the shared bit string are corrected; and a corrected bit string is generated. Then, the error correcting unit 21 of the QKD transmitter 2a stores the corrected bit string in the corresponding storage 26. Herein, the corrected bit string generated by the error correcting unit 21 of the QKD transmitter 2a matches with the corrected bit string generated by the error correcting unit 11 by correcting the shared bit string corresponding to the QKD transmitter 2a.

Step S105

The error correcting unit 21 of the QKD transmitter 2b performs an error correction process in which the shared bit string is read from the corresponding storage 26; control data is exchanged with the error correcting unit 11 via the classical communication channel; the bit errors in the shared bit string are corrected; and a corrected bit string is generated. Then, the error correcting unit 21 of the QKD transmitter 2b stores the corrected bit string in the corresponding storage 26. Herein, the corrected bit string generated by the error correcting unit 21 of the QKD transmitter 2b matches with the corrected bit string generated by the error correcting unit 11 by correcting the shared bit string corresponding to the QKD transmitter 2b.

Step S106

The error correcting unit 21 of the QKD transmitter 2c performs an error correction process in which the shared bit string is read from the corresponding storage 26; control data is exchanged with the error correcting unit 11 via the classical communication channel; the bit errors in the shared bit string are corrected; and a corrected bit string is generated. Then, the error correcting unit 21 of the QKD transmitter 2c stores the corrected bit string in the corresponding storage 26. Herein, the corrected bit string generated by the error correcting unit 21 of the QKD transmitter 2c matches with the corrected bit string generated by the error correcting unit 11 by correcting the shared bit string corresponding to the QKD transmitter 2c.

Step S107

The error rate deciding unit 12 calculates the QBER from the number of errors corrected during the error correction process for generating a corrected bit string. Since the QKD receiver 1 is connected with the QKD transmitters 2a to 2c, the error rate deciding unit 12 calculates the QBER1 to QBER3 corresponding to the QKD transmitters 2a to 2c, respectively.

Step S108

According to the QBER1 that is calculated for the QKD transmitter 2a by the error rate deciding unit 12, the key length calculator 13 calculates a length s1 of encryption keys to be eventually generated.

Step S109

According to the QBER2 that is calculated for the QKD transmitter 2b by the error rate deciding unit 12, the key length calculator 13 calculates a length s2 of encryption keys to be eventually generated.

Step S110

According to the QBER3 that is calculated for the QKD transmitter 2c by the error rate deciding unit 12, the key length calculator 13 calculates a length s3 of encryption keys to be eventually generated.

Step S111

The hash function generator 140 generates a random number r1 to be used in generating a hash function that is required during the key compression process and that has the size corresponding to the length s1 of encryption keys.

Step S112

The hash function generator 140 generates a random number r2 to be used in generating a hash function that is required during the key compression process and that has the size corresponding to the length s2 of encryption keys.

Step S113

The hash function generator 140 generates a random number r3 to be used in generating a hash function that is required during the key compression process and that has the size corresponding to the length s3 of encryption keys.

Step S114

Then, the PA processor 14 sends the information on the length s1 of encryption keys and the random number r1 to the PA processor 24 of the QKD transmitter 2a via the classical communication channel.

Step S115

Then, the PA processor 14 sends the information on the length s2 of encryption keys and the random number r2 to the PA processor 24 of the QKD transmitter 2b via the classical communication channel.

Step S116

Then, the PA processor 14 sends the information on the length s3 of encryption keys and the random number r3 to the PA processor 24 of the QKD transmitter 2c via the classical communication channel.

Step S117

The hash function generator 140 reads the corrected bit string corresponding to the QKD transmitter 2a from the storage 16 and, as illustrated in FIG. 6, generates a hash function H1 that is in the form of an n1×s1 matrix from a length n1 of the corrected bit string (in FIG. 6, written as "n"), the random number r1, and the length s1 of encryption keys (in FIG. 6, written as "s"), and that is randomly configured using the random number r1.

Step S118

The hash function generator 140 reads the corrected bit string corresponding to the QKD transmitter 2b from the storage 16 and, as illustrated in FIG. 6, generates a hash function H2 that is in the form of an n2×s2 matrix from a length n2 of the corrected bit string (in FIG. 6, written as "n"), the random number r2, and the length s2 of encryption keys (in FIG. 6, written as "s"), and that is randomly configured using the random number r2.

Step S119

The hash function generator 140 reads the corrected bit string corresponding to the QKD transmitter 2c from the storage 16 and, as illustrated in FIG. 6, generates a hash function H3 that is in the form of an n3×s3 matrix from a length n3 of the corrected bit string (in FIG. 6, written as "n"), the random number r3, and the length s3 of encryption keys (in FIG. 6, written as "s"), and that is randomly configured using the random number r3.

Meanwhile, as described above, the shared bit string corresponding to each QKD transmitter 2 has the same length, and thus the corrected bit lengths having the same length as the shared bit strings also have the same length to each other. Hence, the lengths n1 to n3 of the corrected bit strings indicate the same. In contrast, the lengths s1 to s3 of encryption keys corresponding to the QKD transmitters 2a to 2c, respectively, are calculated according to the QBER1 to QBER3, respectively. Hence, the lengths s1 to s3 of encryption keys are probably all different from each other. As a result, the hash functions H1 to H3 are probably all different from each other. That is, the hash function generator 140 needs to generate each of the hash functions H1 to H3.

Step S120

The hash function generator 240 of the QKD transmitter 2a reads the corrected bit string from the corresponding storage 26; and generates a hash function H1 in the form of an n1×s1 matrix from the length n1 of the corrected bit string, the received random number r1, and the length s1 of encryption keys. Herein, the hash function H1 generated by the hash function generator 240 of the QKD transmitter 2a matches with the hash function H1 generated by the hash function generator from the corrected bit string corresponding to the QKD transmitter 2a.

Step S121

The hash function generator 240 of the QKD transmitter 2b reads the corrected bit string from the corresponding storage 26; and generates a hash function H2 in the form of an n2×s2 matrix from the length n2 of the corrected bit string, the received random number r2, and the length s2 of encryption keys. Herein, the hash function H2 generated by the hash function generator 240 of the QKD transmitter 2b matches with the hash function H2 generated from the corrected bit string corresponding to the QKD transmitter 2b.

Step S122

The hash function generator 240 of the QKD transmitter 2c reads the corrected bit string from the corresponding storage 26; and generates a hash function H3 in the form of an n3×s3 matrix from the length n3 of the corrected bit string, the received random number r3, and the length s3 of encryption keys. Herein, the hash function H3 generated by the hash function generator 240 of the QKD transmitter 2c matches with the hash function H3 generated from the corrected bit string corresponding to the QKD transmitter 2c.

Step S123

The key compressor 141 performs a key compression process in which the hash function H1 is multiplied to the corrected bit string corresponding to the QKD transmitter 2a; generates an encryption key (a key bit string) having the length s1; and stores the encryption key in the storage 16. Similarly, the key compressor 141 performs a key compression process in which the hash function H2 is multiplied to the corrected bit string corresponding to the QKD transmitter 2b; generates an encryption key (a key bit string) having the length s2; and stores the encryption key in the storage 16. Moreover, the key compressor 141 performs a key compression process in which the hash function H3 is multiplied to the corrected bit string corresponding to the QKD transmitter 2c; generates an encryption key (a key bit string) having the length s3; and stores the encryption key in the storage 16.

Step S124

The key compressor 241 of the QKD transmitter 2a performs a key compression process in which the hash function H1 is multiplied to the corresponding corrected bit string; generates an encryption key (a key bit string) having the length s1; and stores the encryption key in the corresponding storage 26.

Step S125

The key compressor 241 of the QKD transmitter 2b performs a key compression process in which the hash function H2 is multiplied to the corresponding corrected bit string; generates an encryption key (a key bit string) having the length s2; and stores the encryption key in the corresponding storage 26.

Step S126

The key compressor 241 of the QKD transmitter 2c performs a key compression process in which the hash function H3 is multiplied to the corresponding corrected bit string; generates an encryption key (a key bit string) having the length s3; and stores the encryption key in the corresponding storage 26.

During these processes performed by the QKD receiver 1 and the QKD transmitters 2 (the QKD transmitters 2a to 2c) for generating encryption keys in a conventional quantum access network, there is an increase in the processing load of the QKD receiver 1. More particularly, regarding the operation for generating a random number corresponding to the length of encryption keys, the operation for generating a hash function, and the operation for generating an encryption key; the QKD receiver 1 needs to perform those processes individually for each of the QBER1 to QBER3. Thus, when the QKD receiver 1 has n number of QKD transmitters 2 connected thereto; the QKD receiver 1 needs to perform the operation for generating a random number corresponding to the length of encryption keys, the operations for generating a hash function, as well as the operation for generating an encryption key for n number of times. Particularly, while generating a random number, in the case of generating a physical random number that is created due a physical phenomenon instead of generating a pseudo-random number that is created due to a predetermined algorithm; the processing load for creating a random number becomes particularly large. In contrast, each of the QKD transmitters 2a to 2c only need to perform the operation for generating a hash function intended for itself and the operation for generating an encryption key. Hence, there occurs a large bias in the processing load as compared to the processing load of the QKD receiver 1.

In that regard, in the first embodiment, as described above, the error rate deciding unit 12 performs a process to decide a combined error rate by combining the QBER1 to QBER3. More particularly, as described above, from among the calculated QBER1 to QBER3, the error rate deciding unit 12 decides on the maximum value as the QBERmax.

Figure 7:
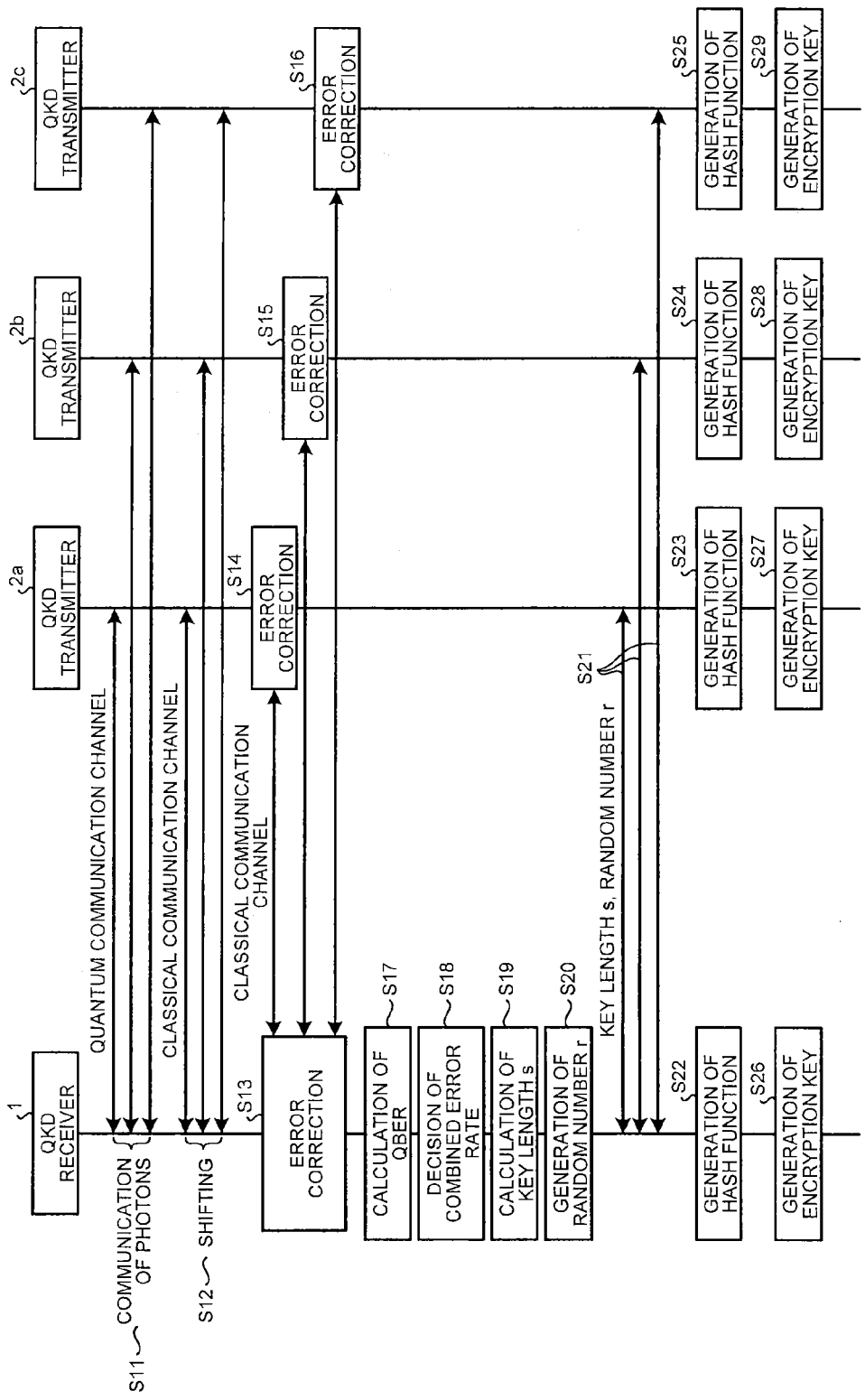
FIG. 7 is a sequence diagram illustrating the operations performed by a QKD device according to the first embodiment.

FIG. 7 is a sequence diagram illustrating the operations performed by the QKD receiver and the QKD transmitter according to the first embodiment. Thus, explained below with reference to FIG. 7 are operations for generating encryption keys performed by the QKD receiver 1 and the QKD transmitters 2 (the QKD transmitters 2a to 2c) according to the first embodiment. The following explanation is given with the focus on the differences with the conventional operations for generating encryption keys as explained with reference to FIG. 5.

Step S11 to Step S17

The processes are identical to the processes performed from Step S101 to Step S107 illustrated in FIG. 5.

Step S18

The error rate deciding unit 12 decides on the maximum value from among the calculated QBER1 to QBER3 as the QBERmax. For example, when the QBER1=5 [%], the QBER2=3 [%], and the QBER3 is =6 [%]; the error rate deciding unit 12 decides on the QBER3 (=6 [%]), which is the maximum value, to be the QBERmax.

Herein, although the maximum value of the QBER is treated as the combined error rate; that is not the only possible case. Alternatively, for example, a value equal to or greater than the maximum value can be treated as the combined error rate. In that case too, there is no compromise on the security of cryptographic communication performed using encryption keys.

Step S19

According to the QBERmax decided by the error rate deciding unit 12, the key length calculator 13 calculates the length s of encryption keys to be eventually generated. Herein, the length s of encryption keys represents a common length in the link between the QKD receiver 1 and each QKD transmitter 2 (each of the QKD transmitters 2a to 2c).

Step S20

In order to generate a hash function required during the key compression process, the hash function generator 140 generates a random number r for the purpose of generating a hash function having the size corresponding to the length s of encryption keys.

Step S21

The PA processor 14 sends the information on the length s of encryption keys and the random number r to the QKD transmitters 2a to 2c via the classical communication channels.

Step S22

The hash function generator 140 reads the corrected bit string corresponding to the QKD transmitter 2a from the storage 16 and, as illustrated in FIG. 6, generates a hash function H1a that is in the form of an n1×s matrix from the length n1 of the corrected bit string (in FIG. 6, written as "n"), the random number r, and the length s of encryption keys. Similarly, the hash function generator 140 reads the corrected bit string corresponding to the QKD transmitter 2b from the storage 16 and, as illustrated in FIG. 6, generates a hash function H2a that is in the form of an n2×s matrix from the length n2 of the corrected bit string (in FIG. 6, written as "n"), the random number r, and the length s of encryption keys. Moreover, the hash function generator 140 reads the corrected bit string corresponding to the QKD transmitter 2c from the storage 16 and, as illustrated in FIG. 6, generates a hash function H3a that is in the form of an n3×s matrix from the length n3 of the corrected bit string (in FIG. 6, written as "n"), the random number r, and the length s of encryption keys. However, as described above, the lengths n1 to n3 of the corrected bit strings represent identical lengths. Hence, if those lengths are considered to be equal to "n", then the hash functions H1a to H3a actually represent the same n×s matrix. Thus, it is sufficient if the hash function generator 140 performs, only once, the operation of generating a hash function H (=H1a=H2a=H3a), which is in the form of an n×s matrix from the length n, the random number r, and the length s of encryption keys, as the common hash function corresponding to the QKD transmitters 2a to 2c.

Step S23

The hash function generator 240 of the QKD transmitter 2a reads the corrected bit string from the corresponding storage 26; and generates a hash function H1a that is in the form of an n1×s matrix from the length n1 of the corrected bit string, the received random number r, and the length s of encryption keys. Herein, the hash function H1a generated by the hash function generator 240 of the QKD transmitter 2a matches with the hash function H generated by the hash function generator 140.

Step S24

The hash function generator 240 of the QKD transmitter 2b reads the corrected bit string from the corresponding storage 26; and generates a hash function H2a that is in the form of an n2×s matrix from the length n2 of the corrected bit string, the received random number r, and the length s of encryption keys. Herein, the hash function H2a generated by the hash function generator 240 of the QKD transmitter 2b matches with the hash function H generated by the hash function generator 140.

Step S25

The hash function generator 240 of the QKD transmitter 2c reads the corrected bit string from the corresponding storage 26; and generates a hash function H3a that is in the form of an n3×s matrix from the length n3 of the corrected bit string, the received random number r, and the length s of encryption keys. Herein, the hash function H3a generated by the hash function generator 240 of the QKD transmitter 2c matches with the hash function H generated by the hash function generator 140.

Step S26

The key compressor 141 performs the key compression process in which the hash function H1a is multiplied to the corrected bit string corresponding to the QKD transmitter 2a; generates an encryption key (a key bit string) having the length s; and stores the encryption key in the storage 16. Similarly, the key compressor 141 performs the key compression process in which the hash function H2a is multiplied to the corrected bit string corresponding to the QKD transmitter 2b; generates an encryption key (a key bit string) having the length s; and stores the encryption key in the storage 16. Moreover, the key compressor 141 performs the key compression process in which the hash function H3a is multiplied to the corrected bit string corresponding to the QKD transmitter 2c; generates an encryption key (a key bit string) having the length s; and stores the encryption key in the storage 16.

Step S27

The key compressor 241 of the QKD transmitter 2a performs the key compression process in which the hash function H1a is multiplied to the corresponding corrected bit string; generates an encryption key (a key bit string) having the length s; and stores the encryption key in the corresponding storage 26.

Step S28

The key compressor 241 of the QKD transmitter 2b performs the key compression process in which the hash function H2a is multiplied to the corresponding corrected bit string; generates an encryption key (a key bit string) having the length s; and stores the encryption key in the corresponding storage 26.

Step S29

The key compressor 241 of the QKD transmitter 2c performs the key compression process in which the hash function H3a is multiplied to the corresponding corrected bit string; generates an encryption key (a key bit string) having the length s; and stores the encryption key in the corresponding storage 26.

As described above, since the error rate deciding unit 12 decides on a combined error rate by combining the QBER that are calculated according to the QKD transmitters 2, the QKD receiver 1 and each of the QKD transmitters 2a to 2c share encryption keys having the same length s.

Thus, in the QKD receiver 1 according to the first embodiment, the error rate deciding unit 12 decides on the combined error rate by combining the QBER. Because of the combined error rate, it is sufficient if the key length calculator 13 performs, only once, the operation for calculating the length of encryption keys. Moreover, since the hash function generator 140 can generate a random number according to a single length of encryption keys that has been decided, it is sufficient to perform the operation for generating the random number only once. Thus, when the QKD receiver 1 has n number of QKD transmitters 2 connected thereto, although the operation for generating an encryption key needs to be performed for n number of times; the operation for calculating the length of encryption keys, the operation for generating a random number, and the operation for generating a hash function need not be performed for each QKD transmitter 2 and may be performed only once. That enables achieving reduction in the processing load of the QKD receiver 1, thereby leading to a reduction in the bias against the processing load of the QKD transmitters 2.

Meanwhile, consider a case in which, among a plurality of error rates (QBER) calculated by the error rate deciding unit 12, the minimum value and the maximum value have a large difference therebetween. In that case, if the maximum value is decided as the combined error rate, then the amount of information removed by the PA processor from the corrected bit string corresponding to the minimum QBER includes an unnecessarily extra amount of information than the amount of information actually leaked to an eavesdropper. In such a case, the length of encryption keys that is generated by the key compressors 141 and 241 becomes smaller, thereby leading to a possibility of a decrease in the efficiency of cryptographic communication. In that regard, among a plurality of error rates (QBER), the difference between the minimum value and the maximum value can be compared with a predetermined threshold value. If the difference is smaller than the predetermined threshold value, then the operations for generating an encryption key as illustrated in FIG. 7 according to the first embodiment are performed. On the other hand, if the difference is equal to or greater than the predetermined threshold value, then the operations for generating an encryption key as illustrated in FIG. 5 according to the first embodiment are performed. As a result, it becomes possible to achieve a balance between a decrease in the efficiency of cryptographic communication, which is attributed to a decrease in the length of encryption keys, and the bias of processing load among the QKD receiver 1 and the QKD transmitters 2.

Meanwhile, as described above, in the hash function generator 140, the key compressor 141, the hash function generator 240, and the key compressor 241; a hash function is used as the method for key compression. However, that is not the only possible case, and key compression can be performed using other methods too.

Figure 8:
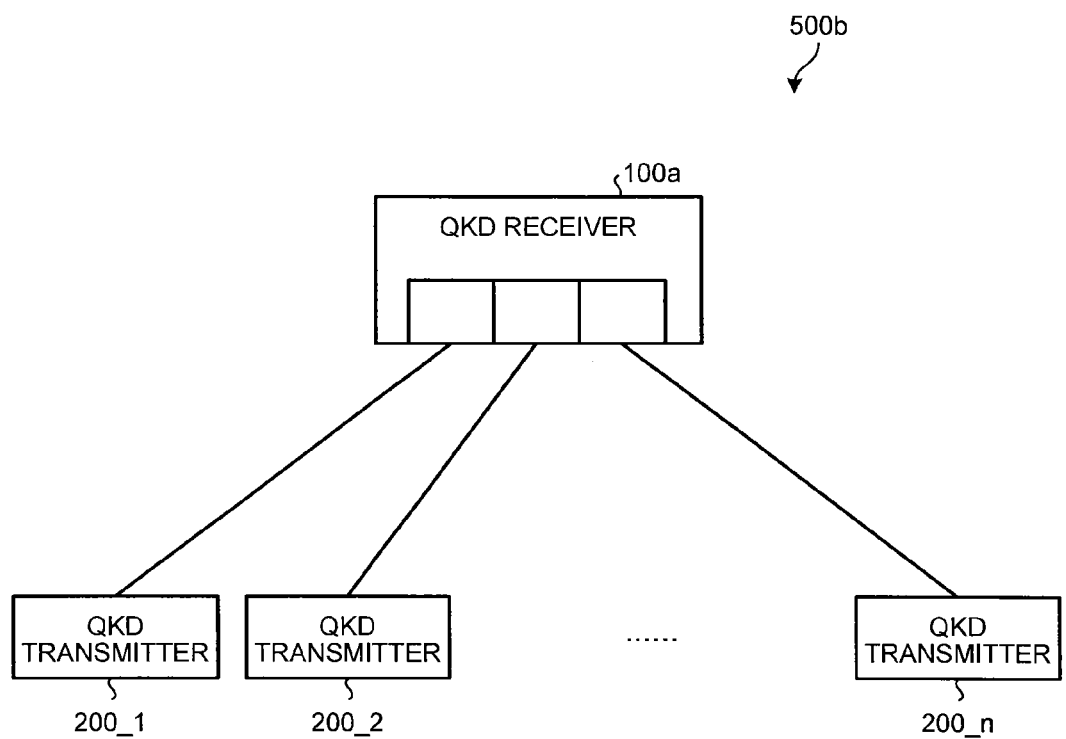
FIG. 8 is a diagram illustrating a configuration of a quantum access network according to a modification example of the first embodiment.

Moreover, in the first embodiment, a quantum access network using the optical device 4 is explained as an example of the quantum key distribution system. However, the quantum key distribution system is not limited to a quantum access network and can be, for example, a quantum access network 500b having the configuration illustrated in FIG. 8.

The quantum access network 500b includes a QKD receiver 100a and n number of QKD transmitters (QKD transmitters 200_1, 200_2, . . . , 200_n). The QKD receiver 100a includes communication I/Fs each of which is used as a quantum communication channel with respect to a QKD transmitter. Thus, to each quantum communication channel is connected a QKD transmitter. In the quantum key distribution system having such a configuration (in the quantum access network 500b) too, it is possible to implement the operations for generating encryption keys as illustrated in FIG. 7. Meanwhile, in the quantum access network 500b, although the QKD receiver 100a functions as a receiver of photon bit strings and the QKD transmitters 200_1, 200_2, . . . , 200_n function as transmitters of photon bit strings, the roles can also be reversed.

Second Embodiment

Regarding a quantum key distribution system according to a second embodiment, the explanation is given with the focus on the differences with the quantum key distribution system (the quantum access networks 500, 500a, and 500b) according to the first embodiment. Meanwhile, herein, the configuration of a QKD device is identical to the first embodiment.

In the first embodiment, the maximum value from among a plurality of error rates is considered as the QBERmax, and the length s of encryption keys is calculated. However, consider a case in which, among a plurality of error rates (QBER) calculated by the error rate deciding unit 12, the minimum value and the maximum value have a large difference therebetween. In that case, if the maximum value is decided as the combined error rate, then the amount of information removed from the corrected bit string corresponding to the minimum QBER includes an unnecessarily extra amount of information than the amount of information leaked to an eavesdropper. In such a case, the length of encryption keys that is generated by the key compressors 141 and 241 becomes smaller. Once the length of encryption keys becomes smaller, more encryption keys are required to perform cryptographic communication, thereby leading to a possibility of a decrease in the efficiency of cryptographic communication. In that regard, in the second embodiment, the explanation is given about an operation in which, depending on the values of a plurality of error rates (QBER), the corresponding QKD transmitters 2 are grouped into a plurality of groups and the combined error rate is decided on a group-by-group basis.

Figure 9:
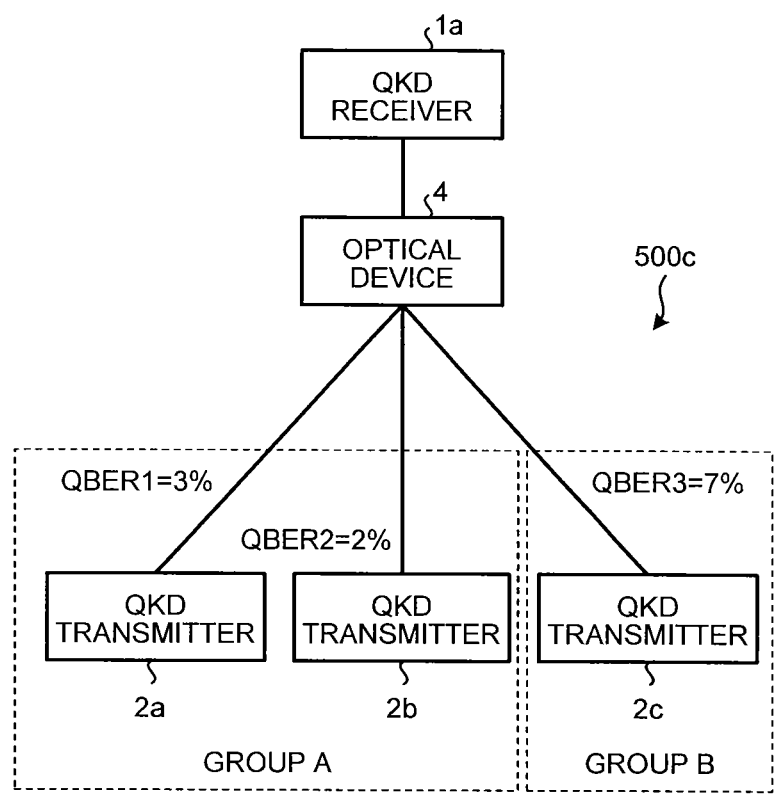
FIG. 9 is a diagram illustrating a specific example of the configuration of a quantum access network according to a second embodiment.

FIG. 9 is a diagram illustrating a specific example of the configuration of a quantum access network according to the second embodiment. Thus, explained below with reference to FIG. 9 is a configuration of a quantum access network in which a single QKD receiver has three QKD transmitters connected thereto. Thus, in the second embodiment, a quantum access network is explained as an example of the quantum key distribution system.

As illustrated in FIG. 9, a quantum access network 500c includes a QKD receiver 1a (a quantum key distribution device), the QKD transmitters 2a to 2c (other quantum key distribution devices), and the optical device 4. The QKD receiver 1a is connected to the optical device 4 by an optical fiber cable serving as a quantum communication channel. Similarly, each of the QKD transmitters 2a to 2c is also connected to the optical device 4 by an optical fiber cable serving as a quantum communication channel.

For example, each of the QKD transmitters 2a to 2c sends, to the QKD receiver 1a via the optical device 4, a photon bit string that is made of single photons which are generated using random numbers and which serve as the basis for generating encryption keys. Moreover, each of the QKD transmitters 2a to 2c performs a shifting process, an error correction process, and a privacy amplification (PA) process (i.e., a key compression process) with respect to the photon bit string that is sent; and generates an encryption key.

Thus, the QKD receiver 1 receives, from each of the QKD transmitters 2a to 2c via the optical device 4, the photon bit string made of single photons that serve as the basis for generating encryption keys. Then, the QKD receiver 1 performs a shifting process, an error correction process, and a PA process with respect to each photon bit string that is received, and generates encryption keys that are identical to the encryption keys generated by the QKD transmitters 2a to 2c, respectively. That is, the QKD receiver 1 and each of the QKD transmitters 2a to 2c share identical encryption keys.

Figure 10:
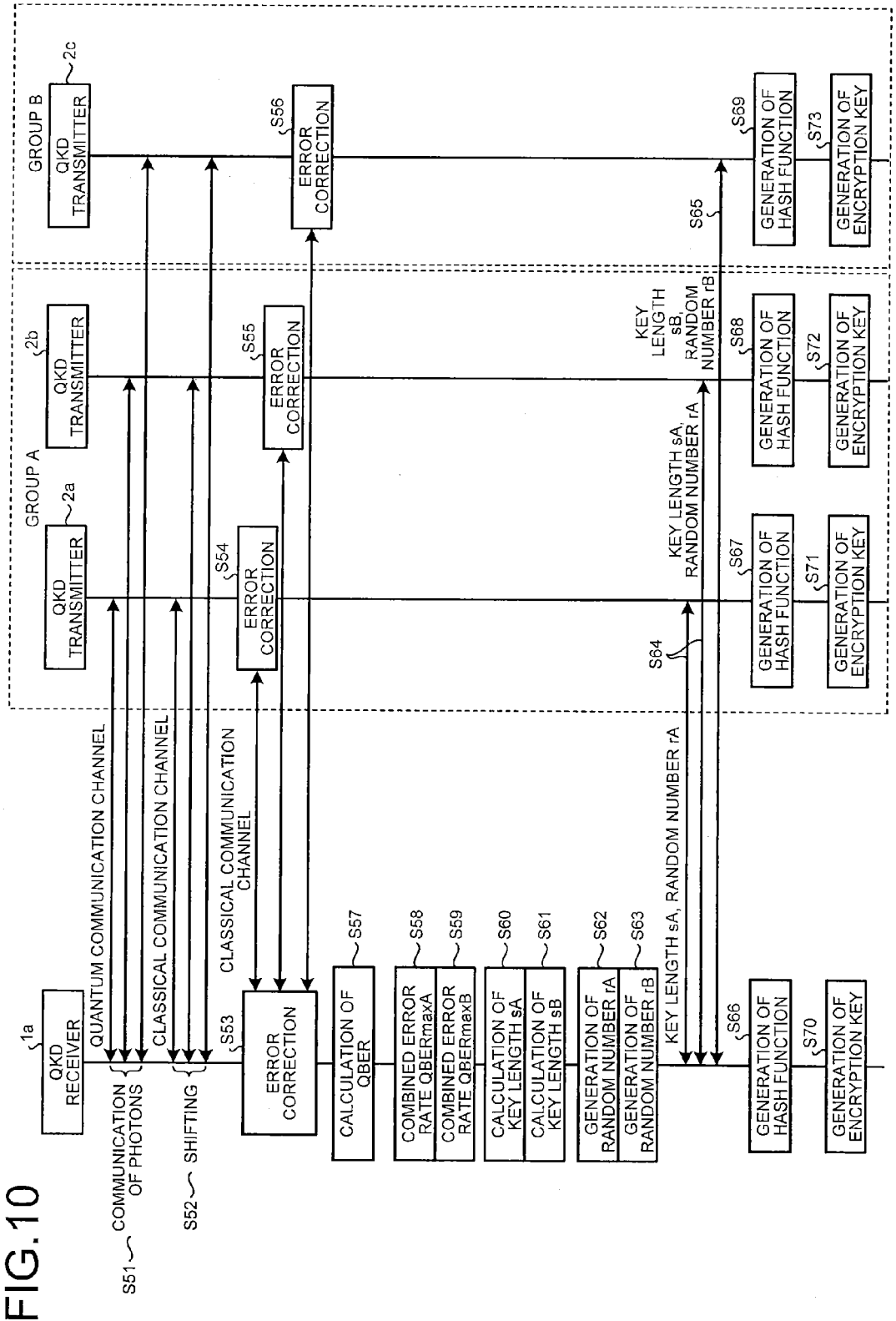
FIG. 10 is a sequence diagram illustrating the operations performed by a QKD device according to the second embodiment.

FIG. 10 is a sequence diagram illustrating the operations performed by the QKD receiver and the QKD transmitter according to the second embodiment. Thus, explained below with reference to FIG. 10 are operations for generating encryption keys performed by the QKD receiver 1a and the QKD transmitters 2 (the QKD transmitters 2a to 2c) according to the second embodiment. The following explanation is given with the focus on the differences with the conventional operations for generating encryption keys explained with reference to FIG. 7 according to the first embodiment.

Step S51 to Step S57

The processes are identical to the processes performed from Step S11 to Step S17 illustrated in FIG. 7.

Step S58 and Step S59

The error rate deciding unit 12 (see FIG. 4) of the QKD receiver 1a groups the QKD transmitters 2 based on the calculated QBER1 to QBER3. For example, with reference to predetermined threshold values dA and dB, if the value of any QBER satisfies $0 \leq QBER < dA$; then the error rate deciding unit 12 puts that QBER in a group A. Similarly, if the value of any QBER satisfies $dA \leq QBER < dB$, then the error rate deciding unit 12 puts that QBER in a group B. Moreover, if the value of any QBER satisfies $dB \leq QBER$, then the error rate deciding unit 12 puts that QBER in a group C. Herein, there is no restriction that the error rates (QBER) are to be grouped into three groups, namely, the groups A to C. Alternatively, it is also possible to group the error rates (QBER) into two groups or into four or more groups. Moreover, the method of grouping is not limited to the method described above. That is, as long as the error rates (QBER) having values close to each other are grouped into the same group; any grouping method can be implemented.

Herein, assume that the error rate deciding unit 12 calculates the QBER1=3 [%], the QBER2=2 [%], and the QBER3=7 [%]. Moreover, assume that the threshold value dA=4 and the threshold value dB=8 have been determined. In this case, as illustrated in FIG. 9, the error rate deciding unit 12 determines that the QKD transmitter 2a corresponding to the QBER1 and the QKD transmitter 2b corresponding to the QBER2 belong to the group A. Similarly, as illustrated in FIG. 9, the error rate deciding unit 12 determines that the QKD transmitter 2c corresponding to the QBER3 belongs to the group B. Moreover, the error rate deciding unit 12 determines that there is no QKD transmitter 2 belonging to the group C.

Then, the error rate deciding unit 12 decides that the maximum value among the QBER1 and QBER2 belonging to the group A (in this case, the QBER1) is a combined error rate QBERmaxA (hereinafter, referred to as a "QBERmaxA") of the group A (Step S58). Subsequently, the error rate deciding unit 12 decides that the maximum value among the error rates (QBER3) belonging to the group B, that is, the QBER3 is a combined error rate QBERmaxB (hereinafter, referred to as a "QBERmaxB") of the group B (Step S59).

Herein, the combined error rate of each group is assumed to be the maximum value of the error rates (QBER) belonging to that group. However, that is not the only possible case. Alternatively, for example, a value equal to or greater than the maximum value can be considered as the combined error rate, and there is no compromise on the security of cryptographic communication using encryption keys.

Step S60

According to the QBERmaxA decided by the error rate deciding unit 12, the key length calculator 13 (see FIG. 4) of the QKD receiver 1a calculates a length sA of encryption keys to be eventually generated. Herein, the length sA of encryption keys is same in each link between the QKD receiver 1a and the QKD transmitters 2a and 2b.

Step S61

Similarly, according to the QBERmaxB decided by the error rate deciding unit 12, the key length calculator 13 calculates a length sB of encryption keys to be eventually generated. Herein, the length sB of encryption keys is same in the link between the QKD receiver 1a and the QKD transmitter 2c.

Step S62

The hash function generator 140 (see FIG. 4) of the QKD receiver 1a generates a random number rA for the purpose of generating a hash function that is required during the key compression process and that has the size corresponding to the length sA of encryption keys.

Step S63

The hash function generator 140 (see FIG. 4) of the QKD receiver 1a generates a random number rB for the purpose of generating a hash function that is required during the key compression process and that has the size corresponding to the length sB of encryption keys.

Step S64

Then, the PA processor 14 (see FIG. 4) of the QKD receiver 1a sends the information on the length sA of encryption keys and the random number rA to the QKD transmitters 2a and 2b via the classical communication channel.

Step S65

Moreover, the PA processor 14 (see FIG. 4) sends the information on the length sB of encryption keys and the random number rB to the QKD transmitter 2c via the classical communication channel.

Step S66

The hash function generator 140 reads the corrected bit string corresponding to the QKD transmitter 2a from the storage 16 (see FIG. 4) and, as illustrated in FIG. 6, generates a hash function HAa that is in the form of an n1×sA matrix from the length n1 of the corrected bit string (in FIG. 6, written as "n"), the random number rA, and the length sA of encryption keys. Similarly, the hash function generator 140 reads the corrected bit string corresponding to the QKD transmitter 2b from the storage 16 and, as illustrated in FIG. 6, generates a hash function HAb that is in the form of an n2×sA matrix from the length n2 of the corrected bit string (in FIG. 6, written as "n"), the random number rA, and the length sA of encryption keys. Moreover, the hash function generator 140 reads the corrected bit string corresponding to the QKD transmitter 2c from the storage 16 and, as illustrated in FIG. 6, generates a hash function HB that is in the form of an n3×sB matrix from the length n3 of the corrected bit string (in FIG. 6, written as "n"), the random number rB, and the length sB of encryption keys. However, as described above, the lengths n1 to n3 of the corrected bit strings represent identical lengths. Hence, if those lengths are considered to be equal to "n", then the hash functions HAa and HAb actually represent the same n×sA matrix. Thus, it is sufficient if the hash function generator 140 performs, only once, the operation of generating a hash function HA (=HAa=HAb), which is in the form of an n×sA matrix from the length n, the random number rA, and the length sA of encryption keys, as the common hash function corresponding to the QKD transmitters 2a and 2b.

Step S67

The hash function generator 240 (see FIG. 4) of the QKD transmitter 2a reads the corrected bit string from the corresponding storage 26 (see FIG. 4); and generates a hash function HAa that is in the form of an n1×sA matrix from the length n1 of the corrected bit string, the random number rA, and the length sA of encryption keys. Herein, the hash function HAa generated by the hash function generator 240 of the QKD transmitter 2a matches with the hash function HA generated by the hash function generator 140.

Step S68

The hash function generator 240 of the QKD transmitter 2b reads the corrected bit string from the corresponding storage 26; and generates a hash function HAb that is in the form of an n2×sA matrix from the length n2 of the corrected bit string, the random number rA, and the length sA of encryption keys. Herein, the hash function HAb generated by the hash function generator 240 of the QKD transmitter 2b matches with the hash function HA generated by the hash function generator 140.

Step S69

The hash function generator 240 of the QKD transmitter 2c reads the corrected bit string from the corresponding storage 26; and generates a hash function HB that is in the form of an n3×sB matrix from the length n3 of the corrected bit string, the random number rB, and the length sB of encryption keys. Herein, the hash function HAb generated by the hash function generator 240 of the QKD transmitter 2c matches with the hash function HB generated by the hash function generator 140.

Step S70

The key compressor 141 (see FIG. 4) of the QKD receiver 1a performs a key compression process in which the hash function HAa is multiplied to the corrected bit string corresponding to the QKD transmitter 2a; generates an encryption key (a key bit string) having the length sA; and stores the encryption key in the storage 16. Similarly, the key compressor 141 performs a key compression process in which the hash function HAb is multiplied to the corrected bit string corresponding to the QKD transmitter 2b; generates an encryption key (a key bit string) having the length sA; and stores the encryption key in the storage 16. Moreover, the key compressor 141 performs a key compression process in which the hash function HB is multiplied to the corrected bit string corresponding to the QKD transmitter 2c; generates an encryption key (a key bit string) having the length sB; and stores the encryption key in the storage 16.

Step S71

The key compressor 241 (see FIG. 4) of the QKD transmitter 2a performs a key compression process in which the hash function HAa is multiplied to the corresponding corrected bit string; generates an encryption key (a key bit string) having the length sA; and stores the encryption key in the corresponding storage 26.

Step S72

The key compressor 241 (see FIG. 4) of the QKD transmitter 2b performs a key compression process in which the hash function HAb is multiplied to the corresponding corrected bit string; generates an encryption key (a key bit string) having the length sA; and stores the encryption key in the corresponding storage 26.

Step S73

The key compressor 241 (see FIG. 4) of the QKD transmitter 2c performs a key compression process in which the hash function HB is multiplied to the corresponding corrected bit string; generates an encryption key (a key bit string) having the length sB; and stores the encryption key in the corresponding storage 26.

In this way, based on the QBER calculated according to each QKD transmitter 2, the error rate deciding unit 12 groups the QKD transmitters 2 and decides on the combined error rate on a group-by-group basis. As a result, the QKD receiver 1a and the QKD transmitters 2a and 2b share encryption keys having the same length sA; while the QKD receiver 1a and the QKD transmitter 2c share encryption keys having the same length sB.

In the second embodiment, the QKD receiver 1a groups the QKD transmitters 2 into a plurality of groups according to a plurality of respective error rates (QBER), and decides on the combined error rate on a group-by-group basis. Because of that, in the QKD receiver 1a, the operation for calculating the length of encryption keys, the operation for generating a random number, and the operation for generating a hash function need not be performed for each QKD transmitter 2 and can be performed on a group-by-group basis. That enables achieving reduction in the processing load of the QKD receiver 1a, thereby leading to a reduction in the bias against the processing load of the QKD transmitters 2.

Moreover, since a plurality of error rates (QBER) get divided into a plurality of groups, the difference between the error rates (QBER) within a single group can be prevented from becoming large. For that reason, the combined error rate is decided on a group-by-group basis. With that, it becomes possible to reduce the amount of information that is unnecessarily removed in spite of not being leaked to an eavesdropper. Hence, it becomes possible to reduce the occurrence of a situation in which the length of encryption keys becomes extremely small, thereby making it possible to prevent a decrease in the efficiency of cryptographic communication. As a result, it becomes possible to achieve a balance between a decrease in the efficiency of cryptographic communication, which is attributed to a decrease in the length of encryption keys, and the bias of processing load among the QKD receiver 1 and the QKD transmitters 2.

Figure 11:
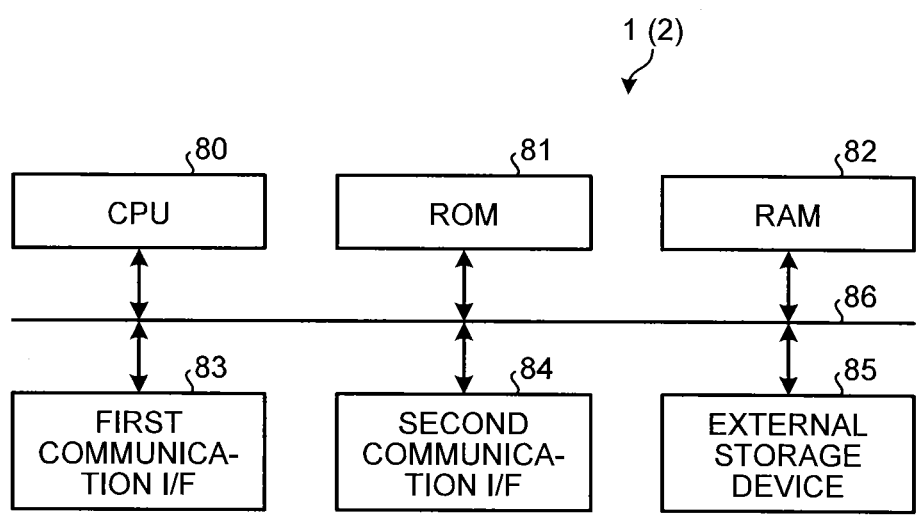
FIG. 11 is a hardware configuration diagram of a QKD device.

FIG. 11 is a hardware configuration diagram of a QKD device. Thus, the explanation of a hardware configuration of the QKD device according to the embodiments described above is given below with reference to FIG. 11.

The QKD device according to the embodiments includes a control device such as the CPU 80, a read only memory (ROM) 81, a random access memory (RAM) 82, a first communication I/F 83 that performs communication via a quantum communication channel, a second communication I/F 84 that performs communication via a classical communication channel, an external storage device 85 that serves as the storage for storing encryption keys, and a bus 86 that connects the constituent elements to each other.

The computer programs executed in the QKD device according to the embodiments are stored in advance in the ROM 81.

Alternatively, the computer programs executed in the QKD device according to the embodiments can be recorded as installable or executable files in a computer-readable storage medium such as a compact disk read only memory (CD-ROM), a flexible disk (FD), a compact disk recordable (CD-R), or a digital versatile disk (DVD); and can be provided in the form of a computer program product.

Still alternatively, the computer programs executed in the QKD device according to the embodiments can be saved as downloadable files on a computer connected to the Internet or can be made available for distribution through a network such as the Internet.

The computer programs executed in the QKD device according to the embodiments can cause a computer to function as the constituent elements of the QKD device (i.e., function as the quantum key sharing unit 10, the error correcting unit 11, the error rate deciding unit 12, the key length calculator 13, the PA processor 14, the application processor 15, the quantum key sharing unit 20, the error correcting unit 21, the PA processor 24, and the application processor 25). In this computer, the CPU 80 can read the computer programs from a computer-readable storage medium, load them into a main storage device, and execute them.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A quantum key distribution device comprising:
a quantum key sharing unit configured to generate a shared bit string by performing quantum key distribution with each of a plurality of other quantum key distribution devices connected via quantum communication channels;
a correcting unit configured to generate a corrected bit string by performing an error correction process to correct an error present in the shared bit string;
a deciding unit configured to calculate an error rate in the corresponding quantum communication channel with respect to each of the other quantum key distribution devices, and decide on a combined error rate from a plurality of error rates calculated;
a calculator configured to calculate, based on the combined error rate, a length of an encryption key to be shared; and
a privacy amplifier configured to generate the encryption key to be shared with the corresponding other quantum key distribution device from the corrected bit string, by performing a key compression process such that the encryption key has the calculated length of the encryption key,
wherein the privacy amplifier includes
a function generator configured to generate a random number for generating a hash function having a size corresponding to the calculated length of the encryption key, and generate the hash function from a length of the corrected bit string, the random number, and the calculated length of the encryption key, and
a compressor configured to generate the encryption key by performing the key compression process using the corrected bit string and the hash function.

2. The device according to claim 1, wherein the deciding unit is configured to decide, as the combined error rate, a value equal to or greater than a maximum value among the plurality of error rates.

3. The device according to claim 1, wherein
the deciding unit is configured to group the plurality of error rates into a plurality of groups, and decide on the combined error rate for each of the plurality of groups,
the calculator is configured to calculate, based on each of the combined error rates, the length of the encryption key, and
the privacy amplifier is further configured to generate the encryption key from the corrected bit string, by performing a key compression process such that the encryption key has the length of the encryption key calculated based on the combined error rate corresponding to the corrected bit string.

4. The device according to claim 3, wherein the deciding unit is configured to perform the grouping into the plurality of groups based on the plurality of error rates.

5. The device according to claim 1, wherein
the deciding unit is configured not to decide the combined error rate when a difference between a minimum value and a maximum value among the plurality of error rates is equal to or greater than a predetermined threshold value,
the calculator is configured to calculate the lengths of the encryption keys based on the respective error rates when the deciding unit does not decide the combined error rate, and
the privacy amplifier is further configured to generate the encryption keys from the corrected bit string corresponding to the respective error rates, by performing the key compression process such that the corresponding encryption key has the corresponding calculated length of the encryption key.

6. A quantum key distribution system comprising:
a quantum key distribution device having
    a quantum key sharing unit configured to generate a shared bit string by performing quantum key distribution with each of a plurality of other quantum key distribution devices connected via quantum communication channels,
    a correcting unit configured to generate a corrected bit string by performing an error correction process to correct an error present in the shared bit string,
    a deciding unit configured to calculate an error rate in the corresponding quantum communication channel with respect to each of the other quantum key distribution devices, and decide on a combined error rate from a plurality of error rates calculated,
    a calculator configured to calculate, based on the combined error rate, a length of an encryption key to be shared, and
    a privacy amplifier configured to generate the encryption key to be shared with the corresponding other quantum key distribution device from the corrected bit string, by performing a key compression process such that the encryption key has the calculated length of the encryption key,
    the privacy amplifier including
        a function generator configured to generate a random number for generating a hash function having a size corresponding to the calculated length of the encryption key, and generate the hash function from a length of the corrected bit string, the random number, and the calculated length of the encryption key, and
        a compressor configured to generate the encryption key by performing the key compression process using the corrected bit string and the hash function; and
a plurality of other quantum key distribution devices, wherein
the privacy amplifier is further configured to send, to each of the other quantum key distribution devices, the calculated length of the corresponding encryption key, and
each of the other quantum key distribution devices is configured to generate the corrected bit string from the shared bit string which has been shared by the quantum key sharing unit, by performing an error correction process, and generate the encryption key from the corresponding corrected bit string, by performing a key compression process such that the encryption key has the length of the encryption key received from the privacy amplifier.

7. The system according to claim 6, wherein the quantum key distribution device and the plurality of other quantum key distribution devices are connected via an optical device by the quantum communication channels to constitute a quantum access network.

8. A quantum key distribution method comprising:
generating a shared bit string by performing quantum key distribution with each of a plurality of other quantum key distribution devices connected via quantum communication channels;
generating a corrected bit string by performing an error correction process to correct an error present in the shared bit string;
calculating an error rate in the corresponding quantum communication channel with respect to each of the other quantum key distribution devices;
deciding on a combined error rate from a plurality of error rates calculated;
calculating, based on the combined error rate, a length of an encryption key to be shared;
generating the encryption key to be shared with the corresponding other quantum key distribution device from the corrected bit string, by performing a key compression process such that the encryption key has the calculated length of the encryption key;
generating a random number for generating a hash function having a size corresponding to the calculated length of the encryption key, and generating the hash function from a length of the corrected bit string, the random number, and the calculated length of the encryption key, wherein
generating the encryption key comprises performing the key compression process using the corrected bit string and the hash function.

* * * * *